United States Patent [19]

Miyamoto

[11] Patent Number: 4,751,848
[45] Date of Patent: Jun. 21, 1988

[54] VIBRATION SENSOR

[75] Inventor: Yasuo Miyamoto, Saitama, Japan

[73] Assignee: Honda Giken Kogyo Kabushiki Kaisha, Tokyo, Japan

[21] Appl. No.: 9,515

[22] Filed: Jan. 30, 1987

[30] Foreign Application Priority Data

Feb. 4, 1986 [JP] Japan .................. 61-23501

[51] Int. Cl.⁴ .............................. G01M 7/00
[52] U.S. Cl. ........................ 73/654; 73/660
[58] Field of Search ............ 73/654, 35, 660; 324/65 R

[56] References Cited

U.S. PATENT DOCUMENTS 4,494,409 1/1985 Kondo et al. .................. 73/654 X

FOREIGN PATENT DOCUMENTS 151110 8/1985 Japan.
493654 2/1976 U.S.S.R. ...................... 73/654

*Primary Examiner*—Jerry W. Myracle
*Attorney, Agent, or Firm*—Lyon & Lyon

[57] ABSTRACT

A vibration sensor for detecting vibration of an object at a prescribed frequency includes a vibratory body capable of resonating at the prescribed frequency and having at least one center of resonant vibration thereof. The vibratory body is made of an electrically conductive elastic material with its conductivity variable according to a strain thereof produced by the resonant vibration, and at least two electrodes disposed around the center of resonant vibration and joined to the vibratory body. The vibration sensor further includes a power supply connected to one of the electrodes, and an actuator having two input terminals and operable when the vibration of the object at the prescribed frequency is detected. One of the input terminals is connected to the other electrode and the other input terminal to the power supply. An electric signal can be produced directly from the vibration sensor via the electrodes. A control circuit or an actuator can be operated by the electric signal at the vibration frequency without using any filter circuit.

14 Claims, 8 Drawing Sheets

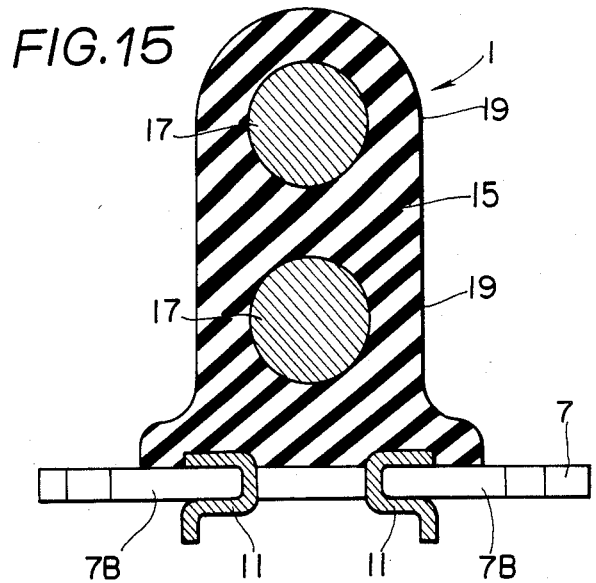
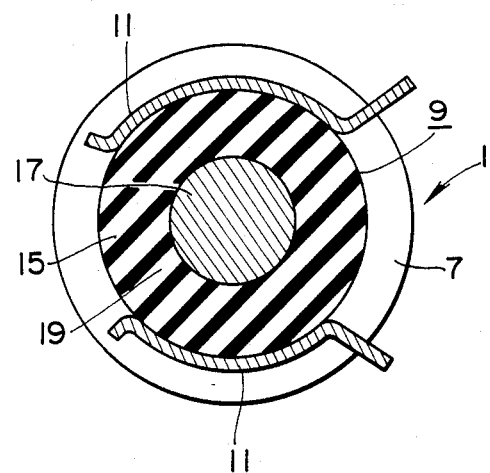
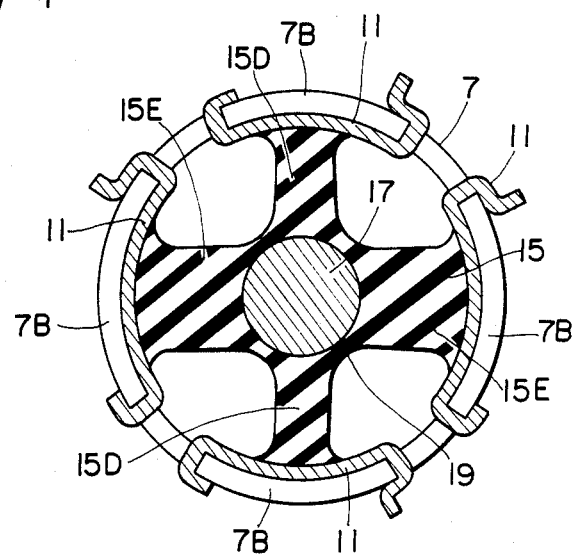

VIBRATION SENSOR

BACKGROUND OF THE INVENTION

1. Field of the Invention:

The present invention relates to a vibration sensor, and more particularly to a vibration sensor for detecting vibration at a desired frequency.

2. Description of the Relevant Art:

Where the frequency of vibration of an automotive engine mount or suspension is detected for use in various control processes, it has been customary to employ a vibration sensor comprising a weight and a piezoelectric device for detecting such vibration. A fluctuating voltage produced by the vibration sensor is passed through a filter circuit, which generates an electric signal in a certain frequency range. The electric signal is applied to a control circuit for operating an actuator or actuators.

Such a vibration sensor is utilized as a road condition sensor in Japanese Laid-Open Patent Publication No. 60-151110 published Aug. 9, 1985. The road condition sensor is mounted on an automobile suspension and converts vibration applied by a road to the automobile into an electric signal commensurate with the vibration frequency. The road condition sensor however tends to generate electric signals of vibration frequencies outside of a certain frequency range that is desired for operating various actuators on the automobile. Therefore, various filter circuits have been needed, in addition to the sensor itself, for extracting an electric signal in the desired frequency range for operating the actuators, from the electric signals generated by the sensor. There has been a demand for simplification of vibration detecting devices and a reduction in the number of parts required of the vibration detecting devices.

SUMMARY OF THE INVENTION

In view of the aforesaid problems of the conventional vibration sensor, it is an object of the present invention to provide a vibration sensor which has a filtering capability and allows a vibration detecting device employing such a vibration sensor to be simplified in structure and to be made up of a reduced number of parts.

According to the present invention, there is provided a vibration sensor for detecting vibration of an object at a prescribed frequency, comprising a vibratory body capable of resonating at the prescribed frequency and having at least one center of resonant vibration thereof, the vibratory body being made of an electrically conductive elastic material with its conductivity variable according to a strain thereof produced by the resonant vibration, and at least two electrodes disposed around the center of resonant vibration and joined to the vibratory body.

The vibration sensor further includes a power supply connected to one of the electrodes, and an actuator having two input terminals and operable when the vibration of the object at the prescribed frequency is detected, one of the input terminals being connected to the other electrode and the other input terminal being connected to the power supply.

The vibratory body resonates by the vibration at the prescribed frequency. Since the conductivity of the electrically conductive elastic material varies with an oscillating strain upon the resonant vibration, an electric signal can directly be produced by the vibration sensor through the electrodes. Therefore, a control circuit or an actuator can be operated by the electric signal at the vibration frequency without using any filter circuit.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 15 is a cross-sectional view of a vibration sensor according to a fifteenth embodiment of the present invention;

FIG. 16 is a cross-sectional view of a vibration sensor according to a sixteenth embodiment of the present invention;

FIG. 17 is a cross-sectional view of a vibration sensor according to a seventeenth embodiment of the present invention.

DETAILED DESCRIPTION OF THE PREFERRED EMBODIMENTS

Figure 1:
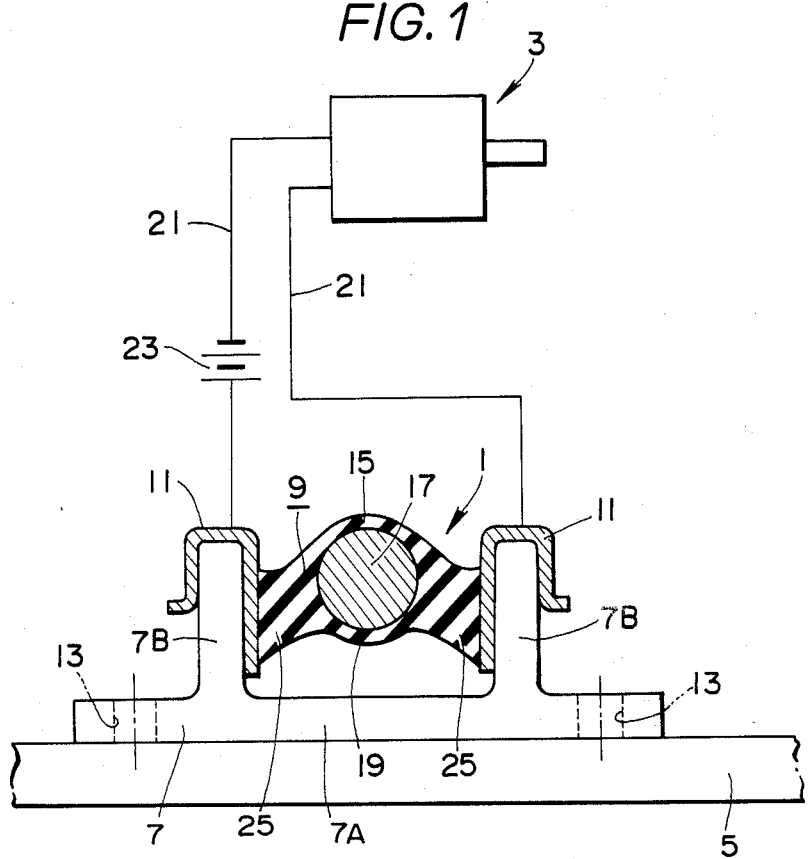
FIG. 1 is a cross-sectional view of a vibration sensor according to a first embodiment of the present invention, the vibration sensor being electrically connected to an actuator to be operated and a power supply.

Like or corresponding parts are denoted by like or corresponding reference numerals throughout several views.

The principles of the present invention are particularly useful when embodied in a vibration sensor for detecting vibration at a certain cyclic period of an object to be detected to operate an actuator.

FIG. 1 shows a vibration sensor according to a first embodiment of the present invention.

The vibration sensor, generally designated by the reference numeral 1, has a vibratory body 9, a pair of electrodes 11 attached to the vibratory body 9, and an attachment member 7 for being attached to an object 5 to be detected. The attachment member 7 is made of resin, for example, and comprises a base 7A having bolt insertion holes 13 defined therein and a pair of support arms 7B projecting from the base 7A and spaced a distance from each other. The electrodes 11 are mounted on the respective support arms 7B so as to cover the upper portions thereof.

An actuator 3 to be operated is electrically connected at its input terminals to the electrodes 11 through respective wires 21, one of which is coupled to a power supply 23.

The vibratory body 9 is made of an elastic material which is electrically conductive and resilient. The conductivity of the elastic material is variable according to a strain thereof. In the illustrated embodiment, the vibratory body 9 is made of electrically conductive rubber 15.

The conductive rubber body 15 has a certain length and is of an upwardly curved shape, with a weight 17 embedded longitudinally centrally therein, thus providing a weight portion 19, so that the vibratory body 9 will resonate at a frequency fn to be detected. Thus, the weight portion 19 serves as a center of vibration due to the resonance thereof.

The resonant frequency fn is expressed by:

$$fn = \frac{1}{2\pi} \sqrt{\frac{kd}{m}}$$

where m is the mass [kg] of the weight 17 and kd is a dynamic spring constant [N/m] of the conductive rubber body 15.

The electrodes 11 are attached to opposite ends of the conductive rubber body 15 and mounted on the support arms 7B of the attachment member 7 with the vibratory body 9 disposed between the electrodes 11. By attaching the attachment member 7 to the object 5, the vibration sensor 1 can be set on the object 5.

With the above arrangement, the weight portion 19 serves as a center of vibration. When the weight portion 19 is displaced downwardly, portions 25 of the conductive rubber body 15 on the opposite sides of the weight portion 19 are compressed to increase the conductivity (i.e., to reduce the electric resistance) of the vibratory body 9. When the weight portion 19 is displaced upwardly, the conductive rubber portions 25 are stretched to reduce the conductivity (i.e., to increase the electric resistance).

Upon vibration of the object 5 at a prescribed frequency fn, the vibratory body 9 resonates to increase the strain of the conductive rubber body 15, resulting in an increased change in the conductivity thereof. Such a conductivity change varies an electric signal applied to the actuator 3 for thereby operating the actuator 3 according to the frequency fn.

According to the embodiment of FIG. 1, therefore, the actuator 3 or a control circuit for controlling the actuator 3 can directly be operated by the vibration sensor 1 without using any conventional filter circuit. The vibration sensor 1 is simple in construction and inexpensive to manufacture, with the consequence that a vibration detecting device incoporating the vibration sensor is also structurally simple, made up of a reduced number of parts, and is of a low cost.

Figure 18:
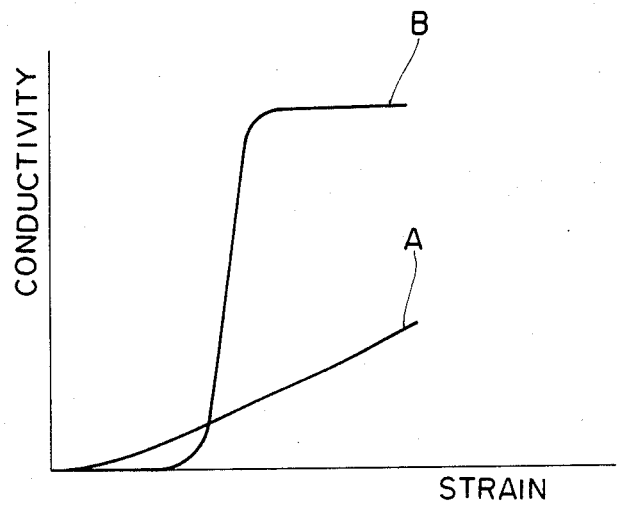
FIG. 18 is a graph showing the relationship between the conductivity and strain of an electrically conductive elastic material used in the present invention.

The rate of change of the conductivity to the strain of the conductive rubber body 15 can be selected as desired by varying the composition of the conductive rubber, i.e., the type and ratio of components thereof. For example, where the conductive rubber contains carbon as a main electrically conductive material, the conductivity varies to a smaller degree with respect to strain as indicated by the curve A in FIG. 18. The conductive rubber of this type is suitable for continuous control of the actuator 3. In case the conductive rubber contains metal particles such as of nickel as a main electrically conductive material, the conductivity varies to a larger degree with respect to strain as indicated by the curve B in FIG. 18. The conductive rubber of this type is suitable for on-off control of the actuator 3. When the conductive rubber body 15 of the characteristic curve B is employed and if the actuator 3 is operable with a relatively small current, a voltage for operating the actuator 3 may be applied to the vibration sensor 1 so that the actuator 3 can directly be operated by the vibration sensor at a certain frequency and amplitude without using any control circuit.

When the weight portion 19 is laterally displaced, one of the conductive rubber portions 25 is compressed whereas the other portion 25 is stretched thereby to vary the conductivity. At this time, an electric signal having a frequency which is twice the resonant frequency fn of the vibratory body 9 is produced.

Other embodiments of the present invention will be described below with reference to FIGS. 2 through 17.

Figure 2:
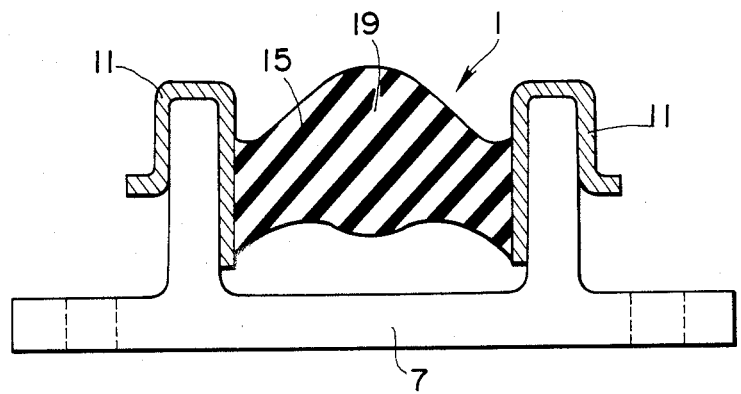
FIG. 2 is a cross-sectional view of a vibration sensor according to a second embodiment of the present invention.

FIG. 2 shows a vibration sensor according to a second embodiment. The vibration sensor 1 of the second embodiment differs from that of the first embodiment in that a weight portion 19 is constructed of conductive rubber 15 itself. The vibration sensor 1 of FIG. 2 is simpler in construction.

Figure 3:
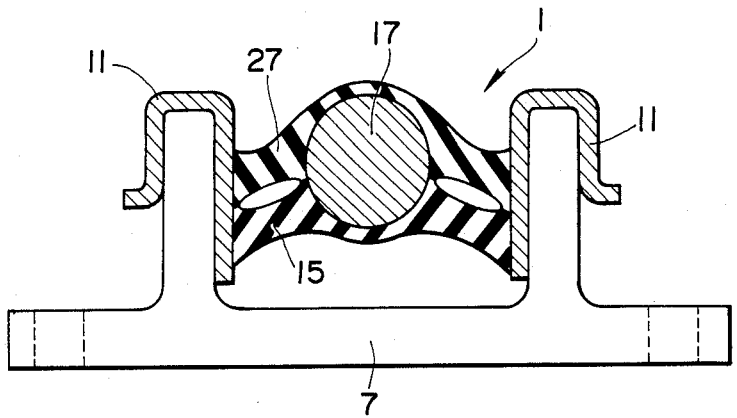
FIG. 3 is a cross-sectional view of a vibration sensor according to a third embodiment of the present invention.

FIG. 3 illustrates a vibration sensor according to a third embodiment. The vibration sensor 1 of the third embodiment has an electrically conductive rubber body 15 which supports the weight 17, and an ordinary electrically non-conductive vibro-isolating rubber body 27 which is elastic but not electrically conductive and which supports the weight 17. The cost of the vibration sensor 1 is reduced since the amount of the conducitve rubber body 15 used is reduced.

Figure 4:
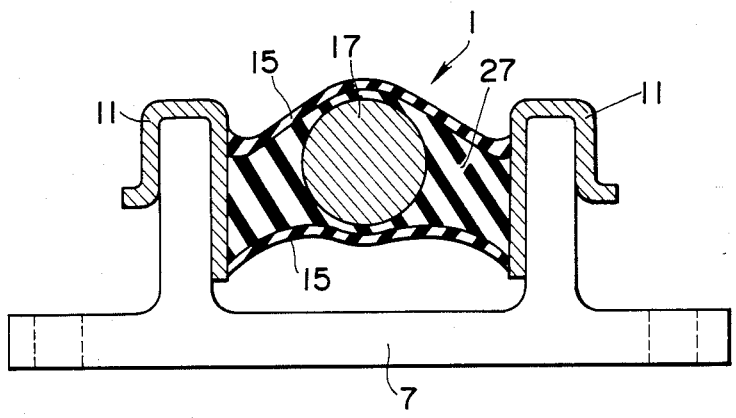
FIG. 4 is a cross-sectional view of a vibration sensor according to a fourth embodiment of the present invention.

According to a fourth embodiment shown in FIG. 4, the weight 17 is supported by an ordinary vibro-isolating rubber body 27 which is coated on its surface with an electrically conductive rubber layer 15.

Figure 5:
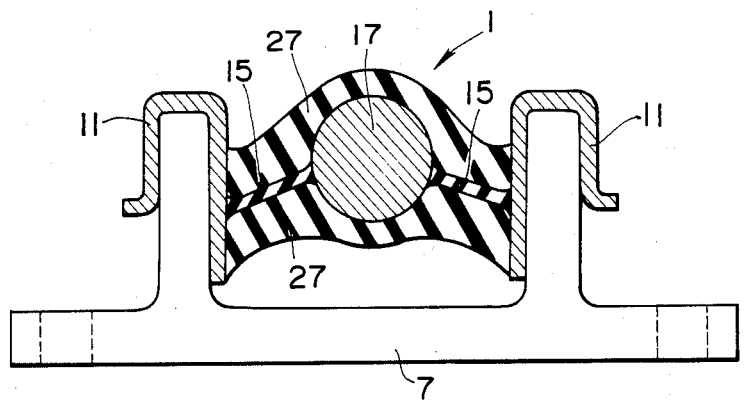
FIG. 5 is a cross-sectional view of a vibration sensor according to a fifth embodiment of the present invention.

In FIG. 5, a vibration sensor 1 according to a fifth embodiment includes an ordinary vibro-isolating rubber body 27 supporting the weight 17 and an electrically conductive rubber layer 15 embedded in the rubber body 27 and extending between the electrodes 11 and the weight 17.

Figure 6:
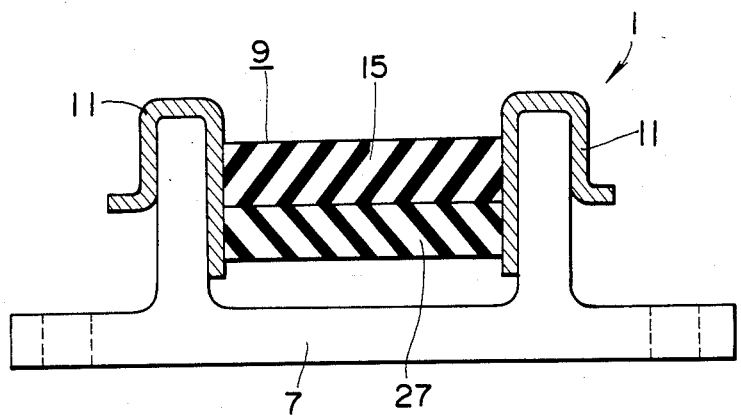
FIG. 6 is a cross-sectional view of a vibration sensor according to a sixth embodiment of the present invention.

In a sixth embodiment illustrated in FIG. 6, a vibration sensor 1 has no weight or weight portion, but includes an electrically conductive rubber body 15 and an ordinary vibro-isolating rubber body 27 extending between the electrodes 11, the bodies 15, 27 each having a uniform cross-sectional shape.

Figure 7:
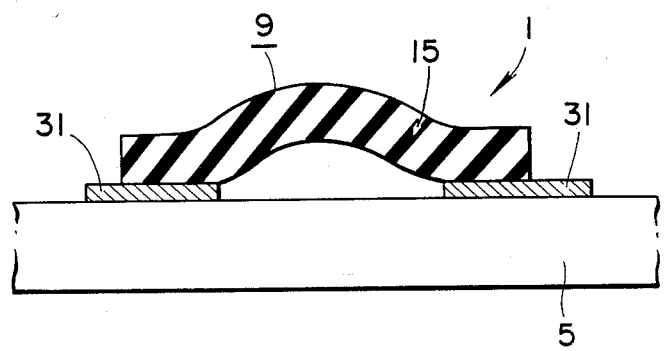
FIG. 7 is a cross-sectional view of a vibration sensor according to a seventh embodiment of the present invention.

FIG. 7 illustrates a seventh embodiment in which a vibratory body 9 comprises an electrically conductive body 15 of uniform cross section extending over a certain length and having a central portion curved or raised upwardly. The vibratory body 9 has opposite ends attached to two spaced printed-circuit boards 31. The printed-circuit boards 31 bear thereon printed circuits serving as respective electrodes. The printed-circuit boards 31 also serve as attachment members for attaching the vibration sensor to the object 5.

Figure 8:
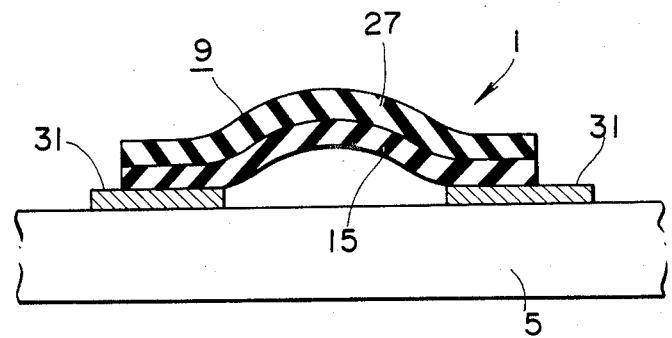
FIG. 8 is a cross-sectional view of a vibration sensor according to an eighth embodiment of the present invention.

As shown in FIG. 8, a vibration sensor 1 of an eighth embodiment comprises an electrically conductive rubber body 15 and an ordinary vibro-isolating rubber body 27 mounted on an upper surface of the rubber body 15, the rubber bodies 15, 27 being substantially equal in shape and size.

Figure 9:
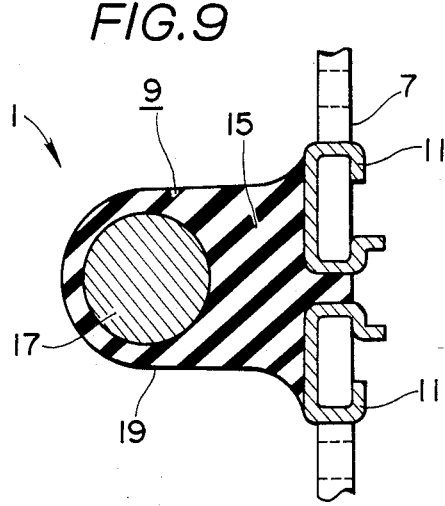
FIG. 9 is a cross-sectional view of a vibration sensor according to a ninth embodiment of the present invention.

According to a ninth embodiment shown in FIG. 9, a vibratory body 9 includes an electrically conductive rubber body 15 extending laterally from and supported on an attachment member 7 and electrodes 11, and the weight 17 is embedded in the free end portion of the rubber body 15, thus providing a weight portion 19. The vibratory body is cantilevered in the ninth embodiment, whereas it is supports at its opposite ends in each of the first through eighth embodiments.

Figure 10:
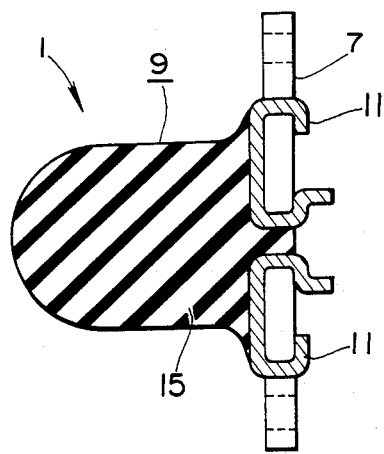
FIG. 10 is a cross-sectional view of a vibration sensor according to a tenth embodiment of the present invention.

FIG. 10 shows a tenth embodiment in which a vibratory body 9 includes no weight and comprises an electrically conductive rubber body 15 extending laterally from and supported on electrodes 11.

Figure 11:
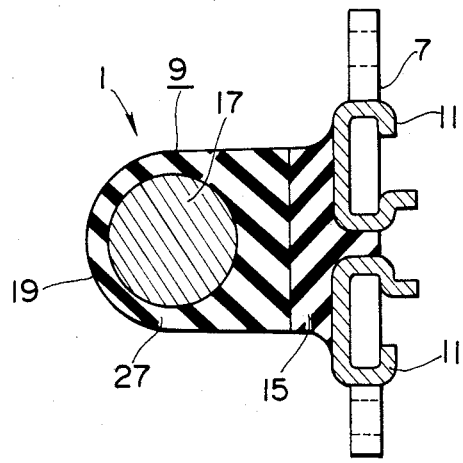
FIG. 11 is a cross-sectional view of a vibration sensor according to an eleventh embodiment of the present invention.

In FIG. 11 which illustrates an eleventh embodiment, a vibratory body 9 includes an electrically conductive rubber body 15 secured to electrodes 11 and an ordinary vibro-isolating rubber body 27 joined to the rubber body 15 remotely from the electrodes 11, with the weight 17 being embedded in the rubber body 27 near its free end. The amount of the electrically conductive rubber body 15 is smaller than that of the ninth and tenth embodiments.

Figure 12A:
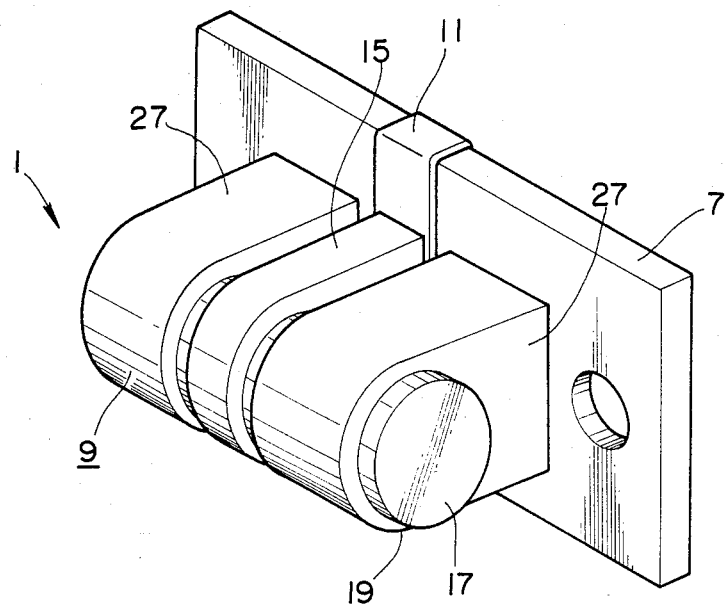
FIG. 12(a) is a perspective view of a vibration sensor according to a twelfth embodiment of the present invention.
Figure 12B:
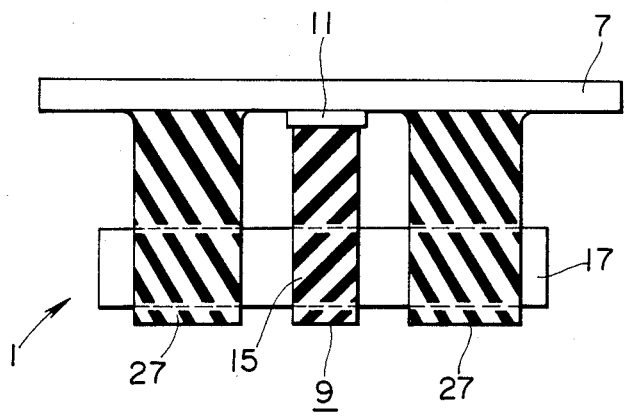
FIG. 12(b) is a cross-sectional view of the vibration sensor shown in FIG. 12(a)

FIGS. 12(a) and 12(b) show a vibration sensor 1 according to a twelfth embodiment of the present invention. The vibration sensor 1 includes a vibratory body 9 comprising an electrically conductive rubber body 15 of reduced thickness extending laterally and supported on an attachment member 7 and electrodes 11, and two spaced vibro-isolating rubber bodies 27 disposed one on each side of the rubber body 15 parallel to each other and extending laterally from and supported on the attachment member 7. The weight 17 extends through and across the free end portions of the rubber bodies 15, 27.

Figure 13:
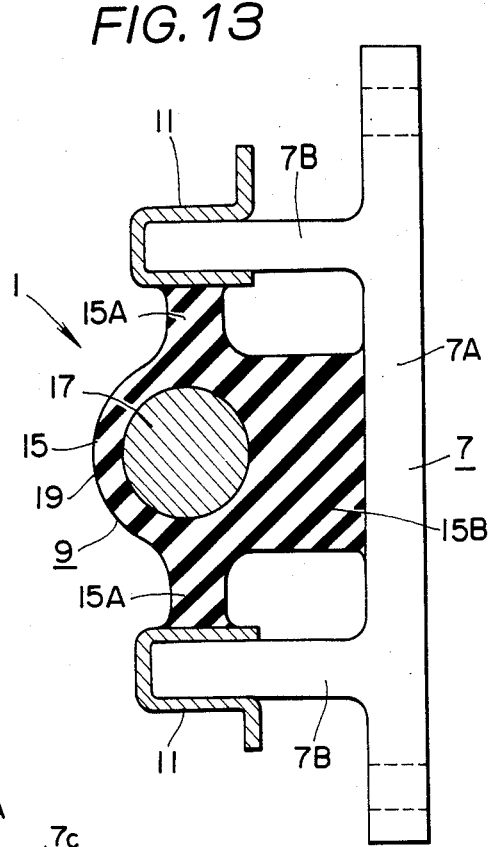
FIG. 13 is a cross-sectional view of a vibration sensor according to a thirteenth embodiment of the present invention.

A vibration sensor 1 according to a thirteenth embodiment shown in FIG. 13 includes two electrodes 11 mounted on the distal ends of support arms 7B projecting laterally from upper and lower portions of a base 7A of an attachment member 7, and a vibratory body 9 comprising an electrically conductive rubber body 15 of substantially T-shaped cross section having two legs 15A and a central leg 15B which are attached to the electrodes 11 and the base 7A, respectively. The weight 17 is embedded centrally in the electrically conductive rubber body 15. The vibration sensor 1 of the thirteenth embodiment is effective in producing an intensive electric signal because the vibratory body 9 is subject to a large strain upon vibration.

Figure 14:
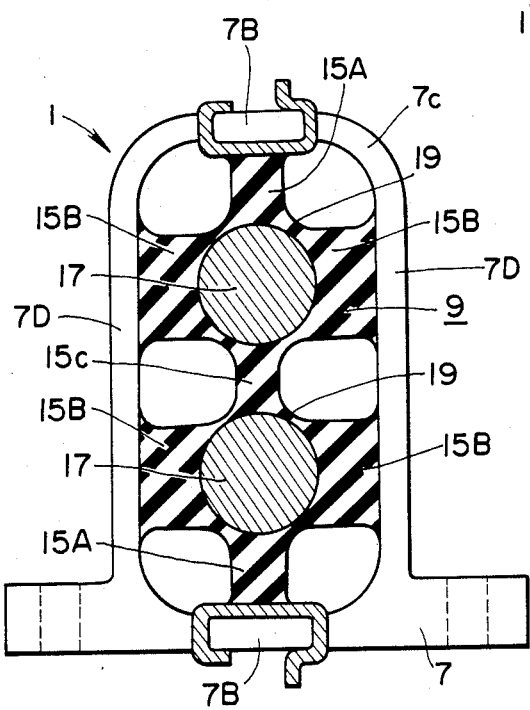
FIG. 14 is a cross-sectional view of a vibration sensor according to a fourteenth embodiment of the present invention.

FIG. 14 illustrates a vibration sensor 1 according to a fourteenth embodiment. The vibration sensor 1 has a vibratory body 9 including two weight portions 19 in which two vertically spaced weights 17 are embedded. The weights 17 are joined to each other by a leg 15c of the rubber body 15. The rubber body 15 includes two vertical legs 15A projecting upwardly and downwardly, respectively, from the respective weights 17, and horizontal legs 15B projecting laterally in two pairs from the weights 17, respectively. An attachment member 7 includes a support frame 7c having two laterally spaced support arms 7D to which the horizontal legs 15B are secured and also having two vertically spaced support arms 7B to which there are attached electrodes 11 joined to the vertical legs 15A, respectively. The vibration sensor 1 of FIG. 14 can detect two frequencies, i.e., a first frequency at which the two weights 17 resonate parallel to each other and a second frequency at which the two weights 17 resonate in opposite directions toward and away from each other, the second frequency being higher than the first frequency.

In FIG. 15, a vibration sensor 1 according to a fifteenth embodiment has two electrodes 11 attached to support arms 7B of an attachment member 7, and an electrically conductive rubber body 15 is supported on and extends upwardly from the electrodes 11 and the support arms 7B. Two vertically spaced weights 17 are disposed in the rubber body 15, thus providing two respective weight portions 19. The vibration sensor 1 of FIG. 15 is also capable of detecting two frequencies as with the fourteenth embodiment.

According to a sixteenth embodiment shown in FIG. 16, a vibration sensor 1 is shaped like a bushing and includes two electrodes 11 attached to an attachment member 7 and a vibratory body 9 having an annular electrically conductive rubber body 15 supported between the electrodes 11. The weight 17 is embedded centrally in the rubber body 15, providing a weight portion 19. The vibration sensor of the sixteenth embodiment is appropriate for the detection of a relatively high frequency inasmuch as the vibratory body 9 has a relatively large spring constant.

As shown in FIG. 17, a vibration sensor 1 according to a seventeenth embodiment includes a vibratory body 9 having an electrically conductive rubber body 15 with the weight 17 embedded centrally therein, the rubber body 15 having two opposite vertical legs 15D and two opposite horizontal legs 15E which extend radially outwardly. The legs 15D, 15E are attached to respective electrodes 11 mounted on support arms 7B, respectively, of an annular attachment member 7. The vibration sensor 1 can detect vertical vibration through the vertical legs 15D and horizontal or lateral vibration through the horizontal legs 15E. If the vibration sensor 1 is provided with legs and electrodes (not shown) extending in a direction normal to the sheet of FIG. 17, the vibration sensor 1 can detect vibration in three mutually orthogonal directions.

Although there have been described what are at present considered to be the preferred embodiments of the present invention, it will be understood that the invention may be embodied in other specific forms without departing from the spirit or essential characteristics thereof. The present embodiments ar therefore to be considered in all aspects as illustrative, and not restrictive. The scope of the invention is indicated by the appended claims rather than by the foregoing description.

I claim:

1. A vibration sensor for detecting vibration of an object at a prescribed frequency, comprising:
   a vibratory body capable of resonating at said prescribed frequency and having at least one center of resonant vibration thereof, said vibratory body being made of an electrically conductive elastic material with its conductivity variable according to a strain thereof produced by the resonant vibration; and
   at least two electrodes disposed around said center of resonant vibration and joined to said vibratory body.

2. A vibration sensor according to claim 1, further including a power supply connected to one of said electrodes, and an actuator having two input terminals and operable when the vibration of the object at the prescribed frequency is detected, one of said input terminals being connected to the other electrode and the other input terminal being connected to said power supply.

3. A vibration sensor according to claim 1, wherein said vibratory body has a weight portion at said center of resonant vibration.

4. A vibration sensor according to claim 3, wherein said vibratory body has at least one layer of electrically non-conductive vibro-isolating elastic body.

5. A vibration sensor according to claim 1, wherein said vibratory body has at least one layer of electrically non-conductive vibro-isolating elastic body.

6. A vibration sensor according to claim 1, further including an attachment member for attaching the vibration sensor to the object, said attachment member having at least one support member supporting said vibratory body through said electrodes.

7. A vibration sensor according to claim 6, wherein said support member includes two support arms spaced from each other, said vibratory body being supported between said support arms through said electrodes.

8. A vibration sensor according to claim 7, wherein said vibratory body is curved away from said attachment member by projecting at said center of resonant vibration.

9. A vibration sensor according to claim 7, wherein said vibratory body is supported in a cantilevered fashion on said support member through said electrodes, said center of resonant vibration being disposed at a free end of the vibration body.

10. A vibration sensor according to claim 9, wherein said vibratory body has a weight portion at said center of resonant vibration.

11. A vibration sensor according to claim 10, wherein said vibratory body includes a vibro-isolating elastic body covering said weight portion 12. A vibration sensor according to claim 10, wherein said vibratory body includes two parallel vibro-isolating elastic bodies spaced from each other and each having one end supported in a cantilevered fashion on said attachment member, said weight portion extending through and across the opposite free ends of said vibro-isolating elastic bodies and joined to said vibratory body.

13. A vibration sensor according to claim 9, wherein said support member includes an annular frame in which said vibratory body is supported.

14. A vibration sensor according to claim 13, wherein said vibratory body includes four legs extending radially outwardly from said center of resonant vibration, said legs having ends supported in said annular frame through said electrodes.

* * * * *